(12) United States Patent
Zhu et al.

(10) Patent No.: US 12,214,994 B2
(45) Date of Patent: Feb. 4, 2025

(54) BRAKE DISC RELEASING DEVICE, TURNING DEVICE, ELEVATOR RESCUE KIT AND METHOD

(71) Applicant: Otis Elevator Company, Farmington, CT (US)

(72) Inventors: FengKun Zhu, Tianjin (CN); Hongliang Wu, Tianjin (CN); James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/297,278

(22) Filed: Apr. 7, 2023

(65) Prior Publication Data

US 2023/0242377 A1   Aug. 3, 2023

Related U.S. Application Data

(62) Division of application No. 16/401,605, filed on May 2, 2019, now Pat. No. 11,667,495.

(30) Foreign Application Priority Data

May 3, 2018   (CN) .......................... 201810413675.7

(51) Int. Cl.
| | | |
|---|---|---|
| B66B 5/02 | (2006.01) | |
| F16D 65/18 | (2006.01) | |
| F16H 19/00 | (2006.01) | |
| F16D 121/16 | (2012.01) | |
| F16D 125/24 | (2012.01) | |
| F16D 125/60 | (2012.01) | |
| F16D 125/64 | (2012.01) | |

(52) U.S. Cl.
CPC .............. *B66B 5/027* (2013.01); *F16D 65/18* (2013.01); *F16H 19/001* (2013.01); *F16D 2121/16* (2013.01); *F16D 2125/24* (2013.01); *F16D 2125/60* (2013.01); *F16D 2125/64* (2013.01)

(58) Field of Classification Search
CPC ......................... F16D 2121/16; F16D 2125/24
See application file for complete search history.

(56) References Cited

U.S. PATENT DOCUMENTS

| | | | |
|---|---|---|---|
| 2,933,943 A | 4/1960 | Buddo et al. | |
| 3,896,925 A | 7/1975 | Mitsui et al. | |
| 4,363,026 A * | 12/1982 | Salmon ................... | H03M 1/30 341/2 |
| 5,228,364 A | 7/1993 | Casas | |

(Continued)

FOREIGN PATENT DOCUMENTS

| | | |
|---|---|---|
| CN | 2934165 Y | 8/2007 |
| CN | 201857178 U | 6/2011 |

(Continued)

OTHER PUBLICATIONS

European Search Report for application EP 19172646.2, dated Feb. 24, 2020, 96 pages.

*Primary Examiner* — Vicky A Johnson
(74) *Attorney, Agent, or Firm* — CANTOR COLBURN LLP

(57) ABSTRACT

A turning device includes a hand disc coupled to an input shaft; a reduction gear set accommodated in a housing and connected to the input shaft and an output shaft; and a shaft connector for connecting the output shaft and a motor spindle.

5 Claims, 2 Drawing Sheets

(56) References Cited

U.S. PATENT DOCUMENTS

| | | |
|---|---|---|
| 5,971,109 A | 10/1999 | Aulanko et al. |
| 6,464,043 B2 | 10/2002 | Wang |
| 6,889,959 B2 | 5/2005 | Cholinski |
| 7,690,483 B2 | 4/2010 | Tegtmeier et al. |
| 8,157,061 B2 | 4/2012 | Gremaud et al. |
| 9,764,926 B2 | 9/2017 | Saarelainen et al. |
| 2007/0227827 A1 | 10/2007 | Madoz |
| 2010/0200338 A1 | 8/2010 | Laliche et al. |
| 2012/0305338 A1 | 12/2012 | Kocher et al. |
| 2016/0332844 A1 | 11/2016 | Polin |
| 2019/0337760 A1 | 11/2019 | Zhu et al. |

FOREIGN PATENT DOCUMENTS

| | | |
|---|---|---|
| CN | 102556796 A | 7/2012 |
| CN | 103754723 A | 4/2014 |
| DE | 19815962 A1 | 10/1999 |
| DE | 19908062 A1 | 8/2000 |
| DE | 102005042194 A1 | 3/2007 |
| DE | 102007033007 A1 | 1/2009 |
| EP | 0834463 A1 | 4/1998 |
| EP | 0990614 A1 | 4/2000 |
| EP | 1616831 B1 | 3/2011 |
| EP | 2477924 B1 | 10/2014 |
| EP | 3239087 A1 | 11/2017 |
| EP | 3243784 A1 | 11/2017 |
| JP | H02270792 A | 11/1990 |
| JP | 4421069 B2 | 2/2010 |
| WO | 9705051 A1 | 2/1997 |
| WO | 02096790 A1 | 12/2002 |
| WO | 2006059182 A1 | 6/2006 |
| WO | 2006066295 A1 | 6/2006 |
| WO | 2015122054 A1 | 8/2015 |

\* cited by examiner

BRAKE DISC RELEASING DEVICE, TURNING DEVICE, ELEVATOR RESCUE KIT AND METHOD

FOREIGN PRIORITY

This application is a divisional of U.S. patent application Ser. No. 16/401,605, filed May 2, 2019, the entire contents of which are incorporated herein by reference, which claims priority to Chinese Patent Application No. 201810413675.7 filed May 3, 2018, and all the benefits accruing therefrom under 35 U.S.C. § 119, the contents of which in its entirety are herein incorporated by reference.

TECHNICAL FIELD

The present invention relates to the field of elevators, and in particular, to an elevator rescue device and method.

BACKGROUND

During an emergency braking of an elevator, a brake disc engages with a friction disc on the motor spindle to stop the elevator. In this case, the elevator car may stop between two floors, making it impossible for passengers to be quickly evacuated from the car. At this moment, if it is desired to release the brake disc to move the car to a safe floor, a high force needs to be applied to the brake disc.

SUMMARY OF THE INVENTION

The objective of the present invention is to solve or at least mitigate the problem in the prior art; according to some feature, the objective of the present invention is to provide a brake disc release device, a turning device, and an elevator rescue package that have simple structures and easy operations. [0004] According to some feature, the objective of the present invention is to provide a simple and effective elevator rescue method. [0005] According to a first aspect, a brake disc release device for elevators is provided, comprising: an actuating mechanism having a first end and a second end; a gear connected to the first end of the actuating mechanism; a first slider capable of sliding along a first guide piece and comprising a rack portion for engagement with the gear and a first wedge portion; a second slider capable of sliding along a second guide piece and comprising a second wedge portion for engagement with the first wedge portion of the first slider; and a pulling cable having a first end connected to the second slider and a second end connected to the brake disc; wherein the actuating mechanism is rotated to drive the gear to rotate, drive the first slider to move in a first direction by means of the engagement between the gear and the rack portion of the first slider, drive the second slider to move in a second direction by means of the engagement between the first wedge portion of the first slider and the second wedge portion of the second slider, and thus drive the pulling cable to pull the brake disc.

Optionally, in the brake disc release device, the first direction is perpendicular to the second direction.

Optionally, in the brake disc release device, the brake disc release device further comprises a housing, wherein the gear, the first slider, and the second slider are arranged inside the housing, and the actuating mechanism and the pulling cable are partially arranged inside the housing.

Optionally, in the brake disc release device, the housing is formed by connecting a lower housing and an upper housing.

Optionally, in the brake disc release device, the brake disc release device further comprises a pedal connected to the lower housing.

Optionally, in the brake disc release device, the actuating mechanism comprises a pair of actuating levers on two sides of the housing, first ends of the pair of actuating levers are connected to the gear via a shaft, and second ends of the pair of actuating levers are connected with each other to form a handle.

Optionally, in the brake disc release device, the first guide piece is a first guide post laterally arranged in the housing, and the first guide post runs through the rack portion and the first wedge portion of the first slider.

Optionally, in the brake disc release device, when the brake disc release device is placed on the ground, the first guide post is oriented horizontally.

Optionally, in the brake disc release device, the second guide piece is a plurality of second guide posts vertically arranged in the housing, and the plurality of second guide posts run through the second slider at the circumference.

Optionally, in the brake disc release device, when the brake disc release device is placed on the ground, the plurality of second guide posts are oriented vertically.

Optionally, in the brake disc release device, the brake disc release device comprises a plurality of pulling cables with second ends thereof being evenly distributed and connected to circumferential positions of the brake disc.

Optionally, in the brake disc release device, the brake disc release device has a capability of magnifying a force by more than 40 times.

Optionally, in the brake disc release device, first ends of the pulling cables are connected to the second slider via bolts, and second ends of the pulling cables are connected to the brake disc via bolts.

According to another aspect, a turning device is provided, comprising: a hand disc coupled to an input shaft; a reduction gear set accommodated in a housing and connected to the input shaft and an output shaft; and a shaft connector for connecting the output shaft and a motor spindle.

Optionally, in the turning device, the reduction gear set comprises a first gear coupled to the input shaft and a second gear coupled to the output shaft.

Optionally, in the turning device, the gear ratio of the second gear to the first gear is greater than 4:1.

Optionally, in the turning device, the housing is connected to a housing of the motor spindle mechanism via a plurality of long bolts.

Optionally, in the turning device, a first end of the shaft connector is connected to the motor spindle via bolts, and the shape of a second end of the shaft connector matches a notch on a corresponding end of the output shaft and can transfer torque.

Optionally, in the turning device, the second end of the shaft connector has a cross-sectional shape of rectangle, regular pentagon, or regular hexagon.

Optionally, in the turning device, the hand disc has a diameter greater than 300 mm.

According to another aspect, an elevator rescue package is provided, comprising: the brake disc release device according to embodiments of the present invention; and the turning device according to the embodiments of the present invention.

According to another aspect, an elevator rescue method is provided, comprising:
connecting the turning device to the motor spindle, and tightly grasping the hand disc of the turning device;
connecting the pulling cables of the brake disc release device to the brake disc; rotating the actuating mechanism of the brake disc release device to pull away the brake disc and thus release the motor spindle; and slowly rotating the hand disc of the turning device to enable the elevator car to dock at a safe floor.

The devices and method according to the present invention have simple structures and convenient operations, which enable an operator to promptly dock an elevator car at a safe floor in an emergency, so as to evacuate passengers trapped in the elevator car.

BRIEF DESCRIPTION OF THE DRAWINGS

The content disclosed by the present invention will become easier to understand with reference to the accompanying drawings. It would be easy for those skilled in the art to understand that the accompanying drawings are only used for description, rather than limiting the protection scope of the present invention. In addition, similar reference numerals in the figures are used to represent similar elements, wherein.

DETAILED DESCRIPTION

It would be easy to understand that, according to the technical solution of the present invention, those of ordinary skills in the art may propose a plurality of interchangeable structural modes and implementation modes without changing the essence and spirit of the present invention. Therefore, the following specific implementation modes and accompanying drawings are merely an exemplary description of the technical solution of the present invention, and should not be deemed as all of the present invention or restrictions or limitations to the technical solution of the present invention.

Terms of directions and locations mentioned or potentially mentioned in this specification, such as up, down, left, right, front, back, front face, rear face, top, bottom, and the like, are defined with respect to the structures in the figures and are relative concepts. Therefore, the terms may change correspondingly when the structures are at different locations and in different use states. As a result, these or other terms of directions and locations shall not be construed as limiting terms.

Figure 1:
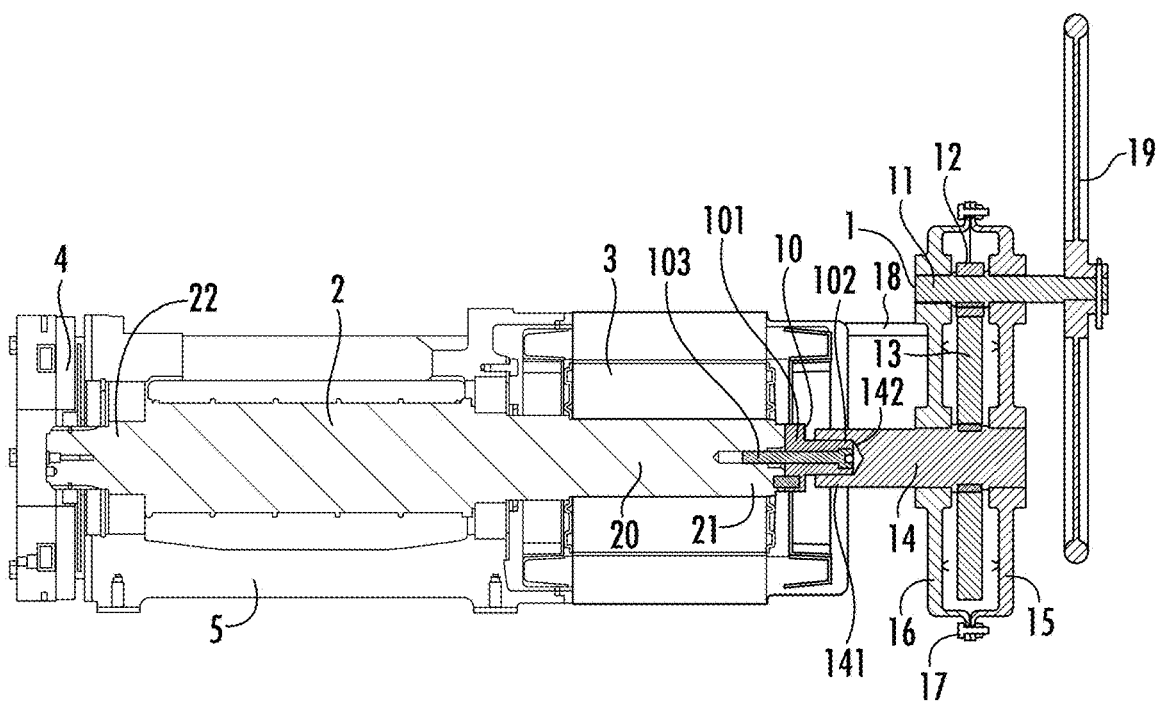
FIG. 1 is a cross-sectional view of a motor spindle and a turning device at one end of the motor spindle according to an embodiment.
Figure 2:
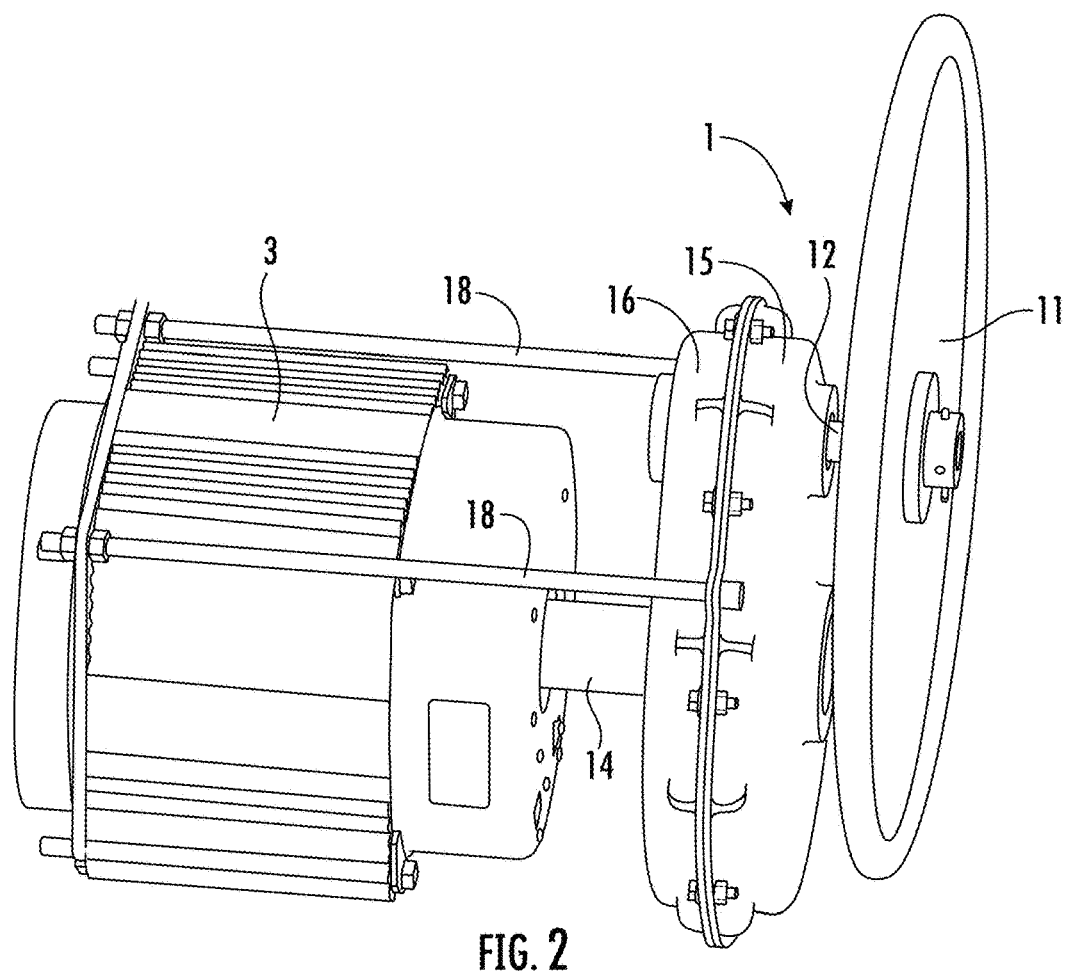
FIG. 2 is a 3-dimensional view of the turning device according to the embodiment and the motor connected thereto.

FIG. 1 and FIG. 2 illustrate a cross section of a motor spindle 2 and a turning device 1 connected to a first end 21 of the motor spindle 2. The motor spindle 2 is supported by a motor spindle mechanism support 5 and may be arranged in a machine room at the top of the elevator shaft. The motor spindle 2 comprises a portion 20 coupled to a motor 3, as well as the first end 21 and a second end 22 on two sides thereof. The motor 3 drives the motor spindle 2 to rotate and drive the cables to pull the elevator car to go up or go down. The second end 22 of the motor spindle 2 is associated with a braking device 4 to be described in detail below. In case of an emergency, the braking device 4 will stop the motor spindle 2, such that the motor spindle 2 is unable to rotate.

At this moment, however, the elevator car may stop between two floors, making it impossible for passengers to be evacuated from the car. In this case, the brake disc release device 6 and the turning device 1 according to the embodiments of the present invention may be used to conveniently dock the car at a safe floor and evacuate passengers in the car.

The turning device 1 acts on the first end 21 of the motor spindle 2 and is intended to control, before the braking device is released, the motor spindle 2, such that the motor spindle 2 will not get out of control after the braking device is released. The turning device 1 comprises, for example, a hand disc 19, and the hand disc 19 is coupled to an input shaft 11. The hand disc 19 is disc shaped and held by an operator. The hand disc 19 may have a big size, for example, a diameter greater than 300 mm, such that the operator can control the motor spindle 2 by using a small holding force. The turning device 1 further comprises a reduction gear set, which is accommodated in a housing and connected to the input shaft 11 and an output shaft 14. In some embodiments, the reduction gear set comprises a first gear 12 coupled to the input shaft 11 and a second gear 13 coupled to the output shaft 14. In some embodiments, the gear ratio of the second gear 13 to the first gear 12 may be, for example, greater than 4:1. It should be understood that the reduction gear set may comprise more gears. The housing is formed, for example, jointly by a front cover 15 and a rear cover 16, which are connected via circumferential bolts 17 and the space therebetween is used for accommodating the reduction gear set. The turning device 1 further comprises a shaft connector 10, and the shaft connector 10 is used for connecting the output shaft 14 and the motor spindle 2. After the turning device 1 grasped by the operator is connected to the motor spindle 2, the braking device 4 can be released, and at this moment, the motor spindle 2 will not rotate without control. The operator slowly rotates the hand disc 19 to control the elevator car to move smoothly to a safe floor.

In some embodiments, to prevent the turning device 1 from shaking, the housing of the turning device 1 is connected to the motor spindle mechanism support 5 via a plurality of bolts 18 (e.g., two bolts 18), specifically the housing portion of the motor 3, thereby providing additional connection points. In this way, there are three connection points between the turning device 1 and the motor spindle mechanism, including the connection point between the output shaft 14 and the motor spindle 2 and the above additional connection points, which ensures the stability of the turning device 1. In some embodiments, the shaft connector 10 is connected between the output shaft 14 and the first end 21 of the motor spindle 2. For example, the end surface of the first end 21 of the motor spindle 2 may be formed with a bolt hole, a first end 101 of the shaft connector 10 is connected to the first end 21 of the motor spindle 2 via a bolt 103, and the shape of a second end 102 of the shaft connector 10 matches a notch 142 on a corresponding end 141 of the output shaft 14 so as to transfer torque. In some embodiments, the second end 102 of the shaft connector 10 may have a cross-sectional shape of rectangle, regular pentagon, or regular hexagon, while the notch 142 on the corresponding end 141 of the output shaft 14 may have a matching shape. In an alternate embodiment, the second end 102 of the shaft connector 10 and the notch 142 on the corresponding end 141 of the output shaft 14 may have any other proper matching shape.

Figure 3:
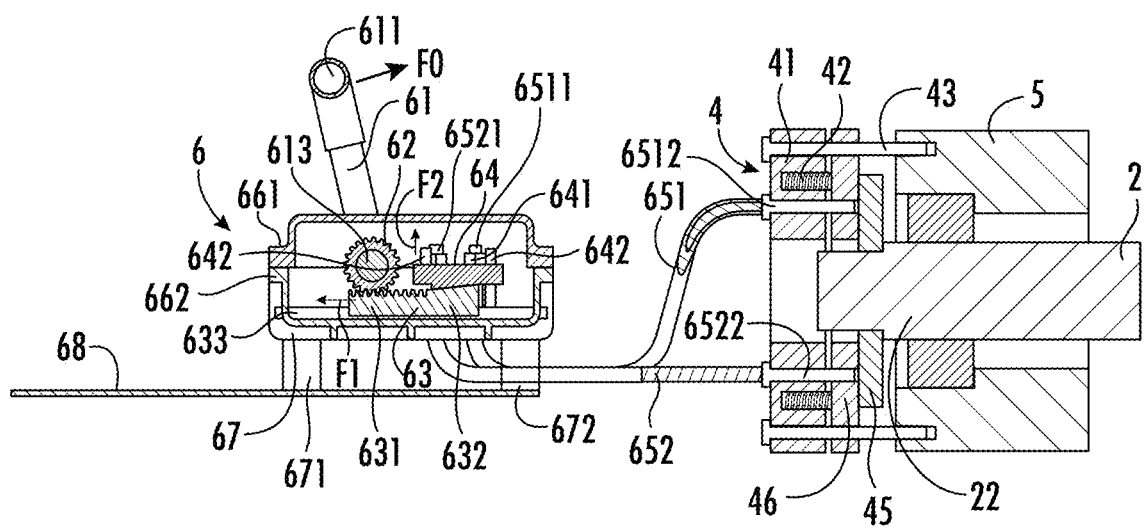
FIG. 3 is a cross-sectional view of the motor spindle and a brake disc release device at the other end of the motor spindle according to an embodiment.
Figure 4:
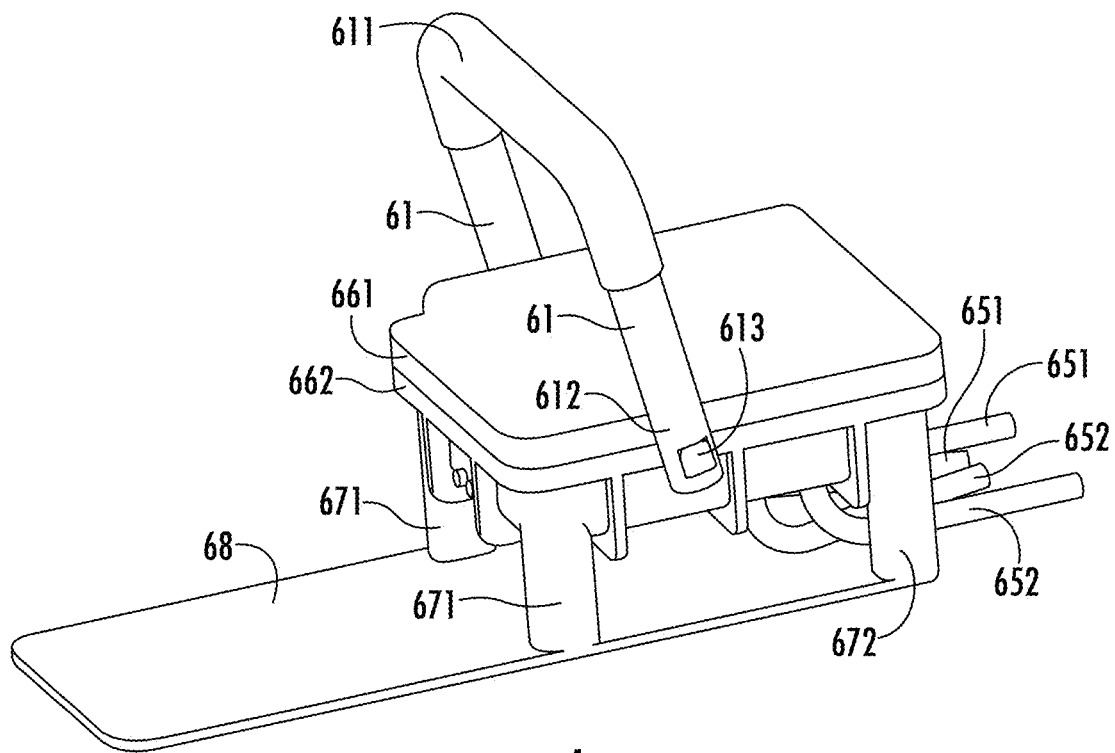
FIG. 4 is a 3-dimensional view of the brake disc release device according to the embodiment.

FIG. 3 and FIG. 4 illustrate the structure of the second end 22 of the motor spindle 2 and the brake disc release device according to the present invention. The second end 22 of the motor spindle 2 is supported by the motor spindle mechanism housing 5 and a bearing. A friction disc 45 is fixedly connected to the second end 22 of the motor spindle 2. The braking device 4 comprises a brake disc 46, wherein one side of the brake disc 46 faces the friction disc 45, and the other side thereof faces an electromagnet 41. In addition, a set of spring devices 42 is further provided between the brake disc 46 and the electromagnet 41, and the spring devices 42 tend to push the brake disc 46 toward the friction disc 45. The electromagnet 41 and the brake disc 46 are provided with holes so as to be fixed onto the motor spindle mechanism housing 5 via bolts 43. When the electromagnet 41 is powered on, the brake disc is attracted to compress the spring devices 42, thereby being separated from the friction disc 45 and not obstructing the rotation of the motor spindle 2. In an emergency, e.g., the elevator exceeds a rated speed, a speed governor will trigger an electric switch, such that the electromagnet 41 is powered off, and the brake disc 46 is no longer subject to the attracting force of the electromagnet 41, but engages with the friction disc 45 under the action by the spring devices 42, thereby stopping the motor spindle 2 and stopping the car. If the elevator car is located between two floors at this moment, it is necessary to release the brake disc 46, so that the motor spindle 2 rotates until the elevator car docks at a safe floor. Since the force applied by the spring devices 42 to the brake disc 46 is high, a special tool is needed to pull away the brake disc 46, such as the brake disc release device 6 according to the present invention.

The brake disc release device 6 may comprise an actuating mechanism 61; a gear 62 connected to a first end 612 of the actuating mechanism 61; a first slider 63, wherein the first slider 63 comprises a rack portion 631 for engagement with the gear 62 and a first wedge portion 632; a second slider 64, wherein the second slider 64 comprises a second wedge portion 641 for engagement with the first wedge portion 632 of the first slider; and pulling cables 651, 652, wherein one ends 6511, 6521 of the pulling cables 651, 652 are connected to the second slider 64, and second ends 6512, 6522 of the pulling cables 651, 652 are connected to the brake disc 46; wherein the actuating mechanism 61 is rotated to drive the gear 62 to rotate, drive the first slider 63 to move in a first direction by means of the engagement between the gear 62 and the rack portion 631 of the first slider 63, drive the second slider 64 to move in a second direction by means of the engagement between the first wedge portion 632 of the first slider and the second wedge portion 641 of the second slider 64, and thus drive the pulling cables 651, 652 to pull away the brake disc 46. In some embodiments, the first direction in which the first slider moves may be perpendicular to the second direction in which the second slider moves. The first slider 63 is arranged below the gear 62, and the second slider 64 is arranged above the gear 62, as shown in the figures; but the first slider 63 and the second slider 64 may also be arranged in any other proper manner. For example, the first slider 63 may be arranged above, at the left side, or at the right side of the gear 62, and the position of the second slider 64 may adjusted accordingly. It should be understood that although the rack portion 631 and the slope of the first wedge portion 632 of the first slider 63 are arranged in parallel at the same side, specifically above the first slider 63, as shown in the figures, the rack portion 631 and the slope of the first wedge portion 632 of the first slider 63 may also be arranged at different sides of the first slider 63 in an alternate embodiment.

In some embodiments, the brake disc release device further comprises a housing, wherein the gear 62, the first slider 63, and the second slider 64 may be arranged inside the housing, and the actuating mechanism and the pulling cable are partially arranged at the inner side of the housing. As shown in FIG. 4, the housing may consist of a lower housing 662 and an upper housing 661. The lower housing 662 and the upper housing 661 may be, for example, connected via circumferential bolts. In some embodiments, the lower housing 662 may be further, for example, connected to a pedal 68 via legs 671, 672, and the operator may fix the brake disc release device 6 by stepping on the pedal. The brake disc release device 6 may also be fixed to the ground in other manners. In some embodiments, the actuating mechanism comprises a pair of actuating levers 61 on two sides of the housing, first ends 612 of the pair of actuating levers 61 are connected to a shaft 613, the shaft 613 is connected to the gear 62, and second ends 611 of the pair of actuating levers 61 are connected with each other to form a handle. The actuating mechanism may also comprise one actuating lever, and a handle may be provided on the second end of the actuating lever.

In some embodiments, the first guide piece is a first guide post 633 laterally arranged in the housing, and the first guide post 633 runs through the rack portion 631 and the first wedge portion 632 of the first slider 63. In some embodiments, when the brake disc release device 6 is placed on the ground, the first guide post 633 is oriented horizontally. In some embodiments, the second guide piece is a plurality of second guide posts 642 vertically arranged in the housing, and the plurality of second guide posts 642 run through the second slider 64 at the circumference. In some embodiments, when the brake disc release device 6 is placed on the ground, the plurality of second guide posts 642 are oriented vertically.

In some embodiments, the brake disc release device 6 comprises a plurality of pulling cables, as shown in FIG. 4, a total of four pulling cables. Second ends 6512, 6522 of these four pulling cables 651, 652 are evenly distributed and connected to circumferential positions of the brake disc, for example, positions at the same radius of the brake disc 46 and mutually spaced apart by 90 degrees, thereby evenly applying a tractive force to the brake disc 46. In some embodiments, first ends 6511, 6521 of the pulling cables 651, 652 are connected to the second slider 641 via bolts, and the second ends 6512, 6522 of the pulling cables are connected to the brake disc 46 via bolts. It can be seen from FIG. 3 that the electromagnet 41 has through holes that allow these bolts to run through. In an alternate embodiment, the pulling cables may also be connected to the second slider 64 or the brake disc 46 in other proper manners. The pulling cables may be, for example, steel cords having a protective layer, which can withstand a high pulling force. With the brake disc release device according to the present invention, a force F0 acted by the operator on the actuating mechanism 61 may be magnified by more than 40 times. For example, the force acted on the actuating mechanism 61 may be 400 N, and this force is magnified, for example, 5 times, by the lever mechanism, such that the force F1 acted on the first slider 631 may be, for example, 2000 N, and this force is further magnified, for example, 10 times, by the wedge slider mechanism, such that the force F2 acted on the second slider may be, for example, 20000 N. Therefore, the operator can provide a force sufficient to pull away the brake disc 46.

In addition, an elevator rescue package is further provided, comprising: the brake disc release device according to the embodiments; and the turning device according to the embodiments.

In addition, an elevator rescue method using this type of elevator rescue package is further provided, comprising: connecting the turning device to the motor spindle, and tightly grasping the hand disc; connecting the pulling cables of the brake disc release device to the brake disc; rotating the actuating mechanism of the brake disc release device to pull away the brake disc and thus release the motor spindle; and slowly rotating the hand disc of the turning device to enable the elevator car to dock at a safe floor.

The turning device and the brake disc release device may be operated by two operators. With the above elevator rescue package, the operators can calmly respond to the emergency that an elevator is stopped between two floors, promptly dock the elevator car to a safe floor, and evacuate passengers trapped in the elevator car.

The above-described specific embodiments are only for more clearly describing the principle of the present invention, wherein all parts are clearly illustrated or described, such that the principle of the present invention is easier to understand. Without departing from the scope of the present invention, those of ordinary skill in the art can easily make various changes or variations to the present invention, therefore, it should be understood that all these changes or variations shall be encompassed in the patent protection scope of the present invention.

What is claimed is:

1. A turning device, comprising:
   a hand disc coupled to an input shaft;
   a reduction gear set accommodated in a housing and connected to the input shaft and an output shaft; and
   a shaft connector for connecting the output shaft and a motor spindle;
   wherein the reduction gear set comprises a first gear coupled to the input shaft and a second gear coupled to the output shaft;
   wherein the gear ratio of the second gear to the first gear is greater than 4:1.

2. A turning device, comprising:
   a hand disc coupled to an input shaft;
   a reduction gear set accommodated in a housing and connected to the input shaft and an output shaft; and
   a shaft connector for connecting the output shaft and a motor spindle;
   wherein the housing is connected to a housing of the motor spindle mechanism via a plurality of long bolts.

3. A turning device, comprising:
   a hand disc coupled to an input shaft;
   a reduction gear set accommodated in a housing and connected to the input shaft and an output shaft; and
   a shaft connector for connecting the output shaft and a motor spindle;
   wherein a first end of the shaft connector is connected to the motor spindle via bolts, and the shape of a second end of the shaft connector matches a notch on a corresponding end of the output shaft and can transfer torque.

4. The turning device according to claim 3, wherein the second end of the shaft connector has a cross-sectional shape of rectangle, regular pentagon, or regular hexagon.

5. The turning device according to claim 1, wherein the hand disc has a diameter greater than 300 mm.

* * * * *